C. BRITAIN.
Lantern Dinner Pail.
No. 41,274.
Patented Jan. 19, 1864.
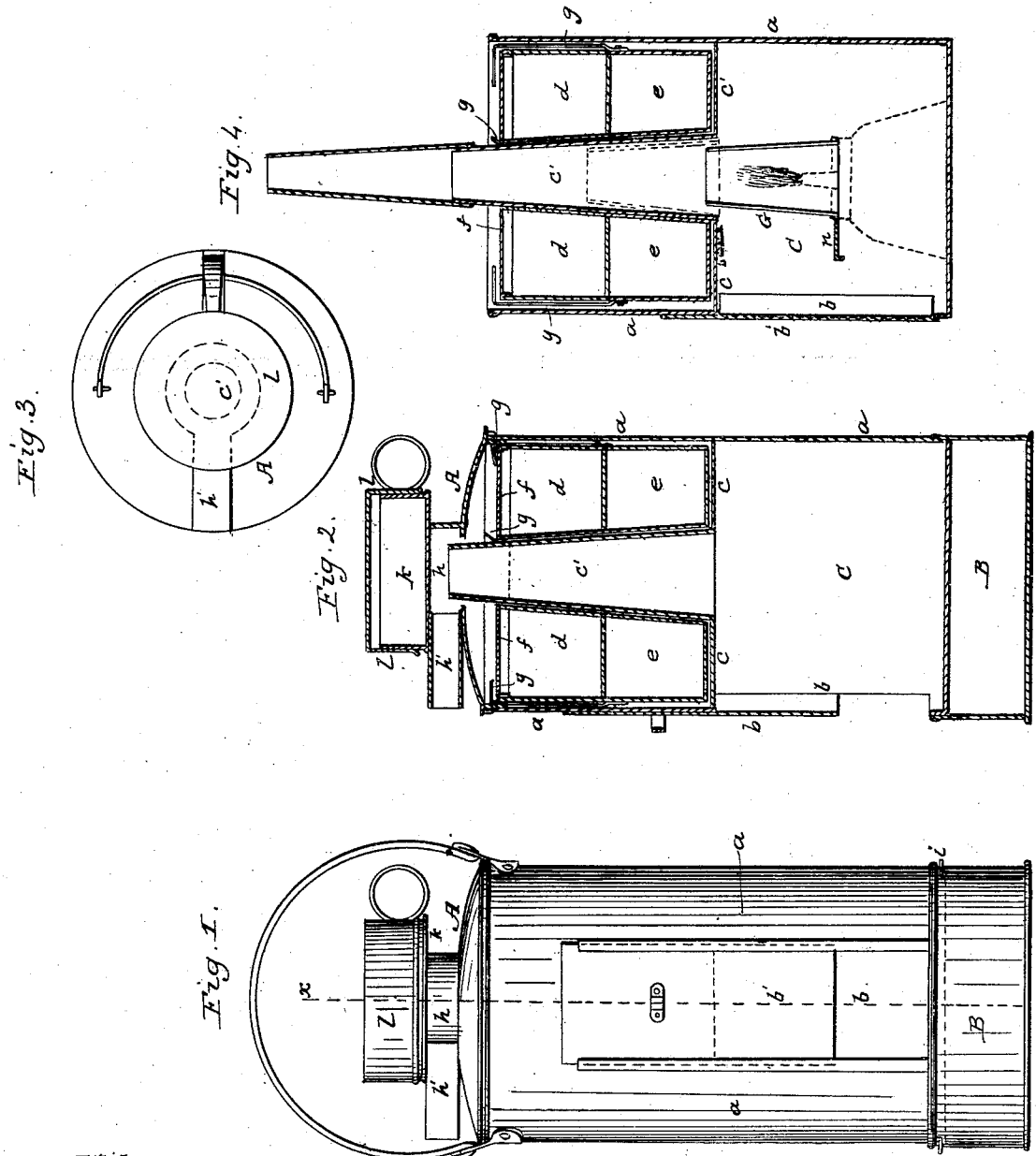

UNITED STATES PATENT OFFICE.

CLARISSA BRITAIN, OF ST. JOSEPH, MICHIGAN.

IMPROVED LANTERN DINNER-PAIL.

Specification forming part of Letters Patent No. 41,274, dated January 19, 1864.

*To all whom it may concern:*

Be it known that I, CLARISSA BRITAIN, of St. Joseph, county of Berrien, State of Michigan, have invented a new and Improved Dinner-Pail; and I do hereby declare that the following is a full, clear, and exact description thereof, reference being had to the accompanying drawings, making a part of this specification, in which—

Figure 1 is a front elevation of my improved dinner-pail complete. Fig. 2 is a vertical diametrical section through Fig. 1. Fig. 3 is a top view of the removable upper portion of the pail. Fig. 4 is a vertical section through the body of the pail, showing the application of a lamp to it.

Similar letters of reference indicate corresponding parts in the several figures.

This invention relates to certain novel improvements in pails or buckets which are used by miners and other persons who are obliged to labor through the day for containing their dinner.

The object of my invention is to construct a dinner-pail in such manner as to furnish means for warming articles of food contained in it, and also, where light is necessary, as in mines, to afford means for giving light at the same time the articles are warming.

It also has for its object a novel arrangement and combination of the several utensils accompanying the pail, which are required for containing different articles of food, so that each article will have a separate and distinct compartment, all as will be hereinafter described.

To enable others skilled in the art to make and use my invention, I will proceed to describe its construction and operation.

In the accompanying drawings, $a$ represents a cylindrical bucket constructed with a closed bottom, an open top, and a door-opening, $b$, in one side, which is closed when desired by a sliding door, $b'$. This bucket may be made elliptical, rectangular, or of any other desired shape, and it may be made of any sheet metal which is found best suited to the purpose. The opening $b$ through the side of this bucket may extend up from its bottom about midway of its height, at or near which point is a horizontal partition or secondary bottom, $c$, which separates the bucket into an upper and lower chamber. In the center of the partition $c$ is a conical pipe, $c'$, which extends up slightly above the top of the bucket $a$ and forms a central flue or chimney through the upper portion of the bucket. The space surrounding the flue $c$ is adapted to contain two shallow pans, $d\ e$, each one of which has a central conical flange or pipe extending up from its bottom, which admit of the pans being placed within the upper receptacle of the bucket around the flue $c'$, which is thus allowed to pass up through the centers of these pans. The upper pan, $d$, forms a cover for the lower pan, $e$, and this latter pan is covered by a plate, $f$, having a central opening through it to allow it to slip over the flue $c$, as shown in Figs. 1, 2, and 3. The two pans $d\ e$ about fill the space in the upper chamber of the bucket. These pans may each be separated into two apartments by partitional plates extending from their flanges to their sides, and each pan should be furnished with a strap-handle, $g$, or other means, by which one or both may be removed from the bucket at pleasure.

The top of the bucket $a$ is provided with a cover or lid, A, which is constructed with a central hollow neck, $h$, projecting at right angles, from which is a short pipe, $h'$, that forms, in connection with the neck $h$, the upper part of the flue $c'$ for allowing the smoke, &c., to escape from this flue $c'$ when the cover A is on the bucket, as will be hereinafter described.

The upper portion of the neck $h$ has a cup, $k$, formed on it, which receives a removable cup, $l$, that is provided with a handle like an ordinary tin cup.

The bottom of the bucket $a$ is adapted for receiving a shallow vessel, B, that may be secured to the bucket by a bayonet-fastening at $i$, or by any other means. This vessel B is very well adapted for containing such articles as it is not required to warm, and it may be removed when heat is applied within the bucket.

In Fig. 4 I have represented a bucket with the cover removed and a long piece of pipe applied to the upper end of the chimney. This plan requires that the cover of the bucket should be removed, and is therefore not preferable to the cover A, which is provided with a flue for conducting off the products of combustion arising from the lamp which is used to heat the contents of the pans $d\ e$.

The lower chamber, C, of the bucket I use for containing a lamp, which may be of any ordinary kind, and which should be situated directly beneath the flues $c'$, as indicated in red lines, Fig. 4. In connection with this lamp I employ a short glass chimney, G, which will slip up within the flue $c'$, as indicated in red lines, Fig. 4, where it may be fastened by a short handle, $n$, on the chimney, and a catch-plate, $n'$, on the bottom of partition $c$. By making this chimney G of glass and the sliding door $b'$ of wire-gauze I obtain a very good lantern, which will be found very useful for miners and others who are required to work in the dark; besides, the same lamp will serve to warm the contents of the bucket and at the same time throw out sufficient light for all ordinary purposes.

From this description it will be seen that I obtain a very useful and at the same time compact lantern dinner-pail, with which articles of food contained in it may be warmed in a short time, the heat from the lamp being conducted up through the centers of the pans $d\ e$. The contents of these pans will be heated very quickly, after which these pans may be removed from the bucket $a$ and other articles warmed in the chamber which was occupied by these pans.

For miners, the chimney or flue $c'$ and the sliding door $b'$ may be so constructed as to provide against danger from using the lamp in the bucket, and, if desirable, the flue for conducting off the smoke from the lamp may be made around the outside circumference of the upper chamber, or of the pans $d\ e$, terminating in a common flue at the upper part of the bucket, as above described, or in any other suitable manner. This plan would be very simple, and would avoid the necessity of having a central chimney and of making each pan $d\ e$ with a central flange or tube projecting up from its bottom.

Having thus described my invention, what I claim as new, and desire to secure by Letters Patent, is—

1. A lantern dinner-pail constructed and operating substantially as and for the purposes described.

2. The combination of the lamp-chamber C, flue $c'$, partition $c$, and upper receptacle for pans $d\ e$, arranged within the pail $a$, substantially as and for the purposes described.

3. Constructing the cover of a dinner-pail with a flue, $h'$, in combination with a flue extending down to the chamber C, substantially as and for the purposes described.

4. The combination of the removable bottom pan, B, lamp-chamber C, and one or more heating-chambers $d\ e$, substantially as and for the purposes herein described.

Witness my hand in the matter of my application for a patent for improved dinner-pail.

CLARISSA BRITAIN.

Witnesses:
CHARLES JEWETT,
S. H. JENNINGS.